(12) United States Patent
Phillips

(10) Patent No.: US 6,979,512 B2
(45) Date of Patent: Dec. 27, 2005

(54) COLLOIDAL BATTERY

(76) Inventor: Edward D. Phillips, 7258 Warwick, Reynoldsburg, OH (US) 43068

( * ) Notice: Subject to any disclaimer, the term of this patent is extended or adjusted under 35 U.S.C. 154(b) by 0 days.

(21) Appl. No.: 10/390,621

(22) Filed: Mar. 19, 2003

(65) Prior Publication Data
US 2004/0185333 A1      Sep. 23, 2004

(51) Int. Cl.$^7$ .................. H01M 10/06; H01M 10/42; H01M 2/24
(52) U.S. Cl. .................. 429/101; 429/160; 429/225; 429/228
(58) Field of Search .................. 429/101, 105, 429/225, 228, 160

(56) References Cited
U.S. PATENT DOCUMENTS 4,317,872 A * 3/1982 Varma .................. 429/302
5,677,075 A * 10/1997 Fujita .................. 429/48
5,804,329 A * 9/1998 Amendola .................. 429/34

* cited by examiner

Primary Examiner—Jonathan Crepeau
(74) Attorney, Agent, or Firm—Kremblas, Foster, Phillips & Pollick

(57) ABSTRACT

A battery is provided having cells, which cells contain an electrolyte and a colloid, with there being at least one connector between directly adjacent cells, with each cell being formed of at least one pair of component sections, with each of the component sections in the pair being separated by a filter. The filter has apertures formed therein. The filter has two sides with a channel formed connecting apertures on opposite sides of the filter. When the battery discharges, the battery will flush the filter. Each of the component sections of the battery is a half-cell. In the preferred embodiment of the invention the colloid is $PbO_2$.

12 Claims, 1 Drawing Sheet

COLLOIDAL BATTERY

BACKGROUND OF THE INVENTION

1. Field of the Invention

The present invention relates generally to a battery, and more particularly to a battery which possesses advantages over conventional batteries.

2. Description of Related Art

Batteries have been around for centuries. One of the most common type of batteries known is the lead acid battery. Common lead storage batteries, such as those used in automotive vehicles, are composed of a number of galvanic cells, each having an electromotive force (emf) of about 2 V. While batteries with multiple cells in automotive vehicles often produce 12 V, there also are 24 V and 32 V batteries available. In galvanic cells, a spontaneous redox reaction, in which the individual half-reactions occur in separated half-cells, can force electron transfer to occur through an external electrical circuit. Of course, for this to occur, the half-cells must be connected electrolytically to complete the electrical circuit.

The construction of typical lead-acid storage batteries includes an anode with its negative charge composed of several plates of lead and a cathode with its positive charge composed of several plates of lead dioxide. Reduction occurs at the positively charged cathode, while oxidation occurs at the negatively charged anode. The electrolyte present in the battery is normally sulfuric acid. However, such batteries possess inherent limitations due to environmental concerns associated with the lead. For example, one of the obvious limitations is the environmental problem caused when the battery is discarded. Not only are there concerns with the corrosive nature of the sulfuric acid, but more important are concerns associated with the toxicity of the lead.

Conventional lead acid batteries experience failure due in part to two distinct situations. The first is hard sulfation, which occurs when the battery has no electrons in its external circuit. This internal oxidation causes sulfation which over time becomes fixed and hard on the battery plates. The second situation is erosion of the active materials from the lead-antimony grids. This erosion is caused by two factors: heat generated by the internal resistance in the battery, and warpage of the grid caused by the heat associated with any charging or discharging of the battery.

Further, some batteries can be recharged. If the battery can hold a charge, either another vehicle must be used to "jump" the battery, or a considerable amount of electricity must be used over a period of time to sufficiently recharge the battery. At the point in time when the battery can no longer hold a charge, the battery must be removed from the vehicle, and a new battery placed into the vehicle. This requires time, necessitates that the vehicle not be used until such time as a new battery is installed, and may well involve disposal of the old battery, despite the environmental concerns with lead. Additionally, conventional lead acid batteries utilize a lead/antimony grid system which system takes up space and adds weight to the battery. Finally, conventional lead acid batteries only produce an output per cell of roughly 2 V.

It is thus apparent that the need exists for an improved battery to overcome problems with existing batteries and to provide solutions to several long-term problems.

BRIEF SUMMARY OF THE INVENTION

There is disclosed a battery having cells, said battery containing a colloid and an electrolyte, with said cells being oriented such that there is at least one conductor, with the conductor shown as being metallic, between directly adjacent cells, each cell being formed of at least one pair of component sections, with each of the component sections in the pair being separated by a filter. The filter has apertures formed therein. The filter has two sides with a channel formed connecting apertures on opposite sides of the filter. When the battery discharges, the discharge of said battery flushes the filter. Each of the component sections of the battery is a half-cell. In the preferred embodiment of the invention, the colloid is $PbO_2$.

There is also disclosed a battery having cells, with there being at least one conductor extending between directly adjacent cells. The cells contain an electrolyte and a colloid preferably in the form of $PbO_2$, with the cells being formed of at least one pair of component sections, with each of the component sections in the pair being separated by a filter. The filter has apertures formed therein on each of its two sides, with a channel formed connecting apertures on the opposite sides of the filter. When the battery discharges, the battery flushes the filter. Each of the component sections of the battery is a half-cell.

One advantage of this battery is that it eliminates the greater weight associated with conventional lead acid batteries by not having to utilize a lead/antimony grid system. Another advantage is that tests have shown that this battery exhibits a higher voltage than would otherwise be expected, resulting in more power or output per unit for batteries of similar weight. An important aspect of this is that instead of the 2 V output associated with prior art battery cells, the cell of this invention has exhibited an open circuit voltage of 2.4–2.65 V.

Still another advantage is that the battery of this invention is believed to be cheaper than conventional lead acid batteries. Furthermore, it is pollution free, since the colloid does not need to be discarded, but instead can be effectively recharged. This translates into a longer battery life, since an important aspect of this invention is that this recharging could involve draining the colloid into what the inventor defines as a recharging station and refilling the battery with recharged colloid, all in a relative short amount of time.

Other aspects and advantages of the instant invention will be appreciated from the following description, drawings, and the appended claims.

DETAILED DESCRIPTION OF THE INVENTION

Figure 1:
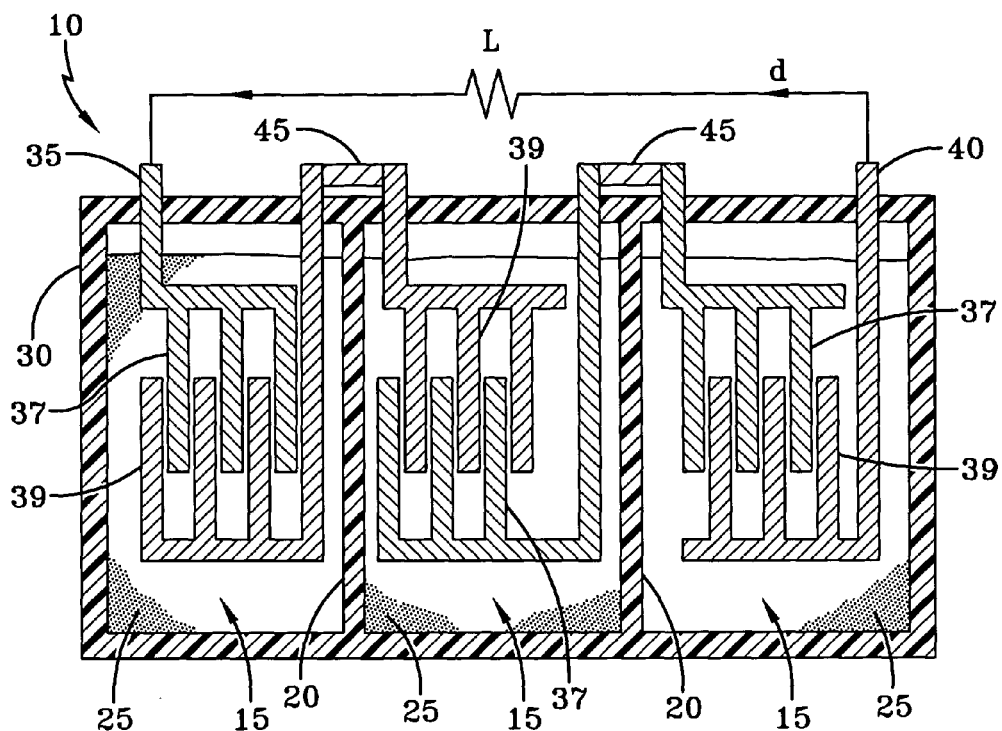
FIG. 1 discloses a schematic diagram of a storage battery made in accordance with the prior art.

Having reference to the drawings, attention is directed first to FIG. 1 which discloses a schematic diagram of a prior art storage battery designated generally by the numeral 10. The battery 10 shown is a six-volt battery comprising three cells 15 connected in series, although it should be appreciated that the number of cells shown is for purposes of example and that the battery made in accordance with the teachings of the prior art could utilize any number of cells.

Each cell 15 is separated by a cell spacer 20. Each cell is filled with an electrolyte 25, which in the case of lead-acid batteries is typically sulfuric acid, $H_2SO_4$. The housing 30 of most batteries is typically plastic, as are the cell spacers 20. Plastic is selected since it does not react with the electrolyte and it tends to resist the corrosive effect of the electrolyte.

Extending above the housing 30 of the battery 10 is an anode 40 and a cathode 35, with the anode 40 carrying a negative charge and the cathode 35 carrying a positive charge. The cathode 35 is connected to one of a series of plates 37 of lead, Pb, while the anode 40 is connected to one of a series of plates 39 of lead dioxide, $PbO_2$. As can be appreciated from FIG. 1, the plates of lead are connected together by cell connectors 45. The plates of lead as well as the plates of lead dioxide are often fabricated using a lead-antimony grid. It should be appreciated that the number of plates shown is for purposes of example and that prior art batteries made in accordance with the teaching of the prior art could utilize additional plates. The ion flow associated with the prior art battery is in direction "d" as it passes though the battery and through load L.

Figure 2:
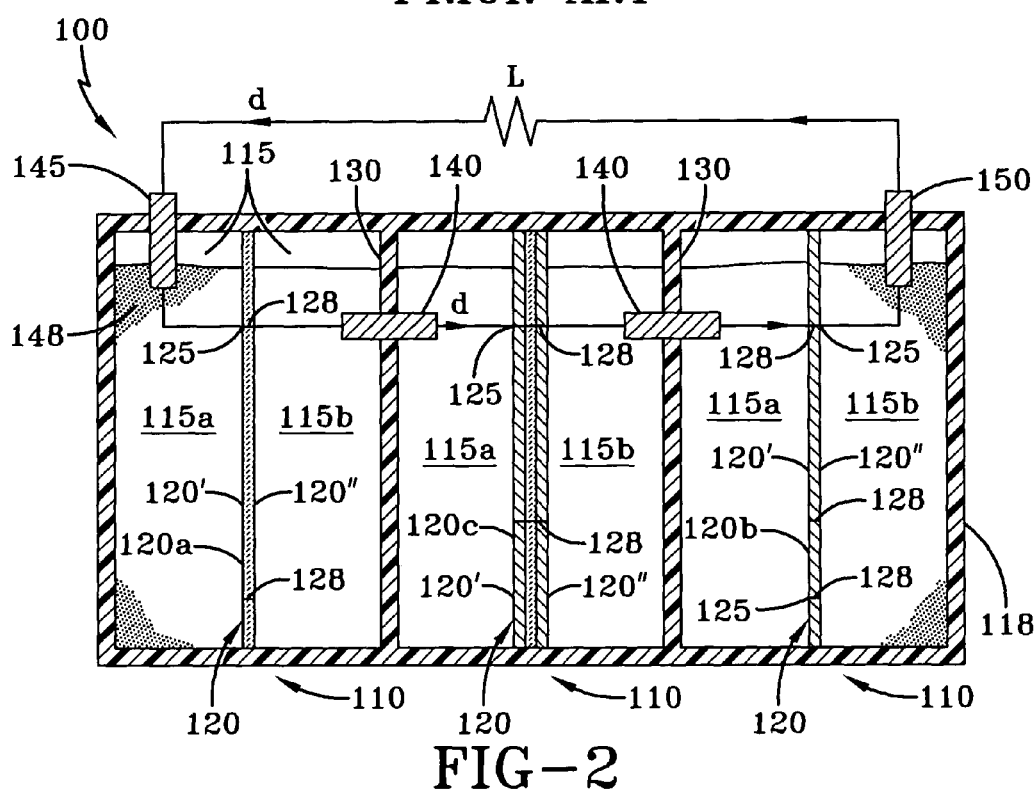
FIG. 2 discloses a schematic diagram illustrating an embodiment of the present invention.

Turning now to FIG. 2, it discloses a schematic diagram of a battery made in accordance with one embodiment of the present invention, with the battery of this invention being designated generally by the numeral 100. Viewing the new battery 100 in the most simplistic way, it can be appreciated that it comprises at least one cell 110 with the cell having two component sections 115 separated by a filter 120 having opposite sides 120' and 120". The one component section 115a contains $PbO_2$, while the other 115b contains Pb in the form known as spongy lead, such that one component section 115a utilizes a positively charged colloidal solution while the other section 115b utilizes a negatively charge colloidal solution. The cells of the battery are contained in a housing 118.

The reason spongy lead has been chosen is that it possesses a greater surface area than, for example, lead pellets, therefore enabling more ions to be generated. This greater surface area is attributed to the fact that spongy lead is acicular. Consequently, the lead used in the battery 100 of this invention possesses a greater surface area to react with than the conventional lead deposited on a plate. Batteries made in accordance with what the inventor has characterized above as being the colloidal aspect of this invention could utilize metals other than lead colloid, such as nickel, iron, and cadmium.

The filter 120 of this invention features an inert substance that preferably has been laser-drilled. In one embodiment of the invention, the filter is 3" tall, ⅛" thick, and 1" wide. Prior art ceramic filters feature interstitial cavities within the filters which force the ion flow to follow a circuitous path. By using an inert, laser-drilled filter as is proposed in this invention, the desired advantages are achieved. While ceramic filters 120a (shown by way of example in the left cell of FIG. 2) are believed to be completely acceptable, it is understood that other inert filter types might be able to be successfully utilized, for example, stainless steel 120b (shown by way of example in the right cell of FIG. 2).

Furthermore, a sandwich-style of filter 120c (shown by way of example in the middle cell of FIG. 2) featuring a combination of stainless steel and ceramic layers is yet another alternative. For example, one embodiment of the sandwich-type filter, which is the preferred embodiment, could have laser-drilled a ceramic sheet encased in a stainless steel cover. By making the filter thinner and sandwiched, it is submitted that three desirable goals are achieved, namely, the resistance of the filter is reduced, the battery is made lighter, and the battery's voltage is able to be increased.

Regardless of the type of filter utilized, it would be desirable that such a filter be thin. The thinner the filter, the faster the ion flow therethrough is accomplished. Still further, the greater the number of apertures 125 in the filter, the less the resistance, so surface area of the filter is important, since a greater surface area would permit more apertures.

Desirable results have been achieved by existing filters having filter apertures 125 that are approximately 2 angstroms in diameter, it being understood that the molecular diameter of $PbO_2$ is approximately 2.8 angstroms. Regardless of the type of filter used, it has two sides 120' and 120" with a channel 128 formed connecting apertures 125 on opposite sides of the filter. Furthermore, it is believed that diameters in the range of between 0.5 and 3 angstroms should be investigated as the invention is refined, although, in a preferred embodiment the range is thought to be between 1 and 2.75 angstroms. One objective associated with the filters is to have ones that do not clog up. It is submitted that the back flow of ions between the cooperating half-cells will help minimize occlusions.

Each cell 110 is separated by a separator 130. In prior art batteries, the separators between cells have been made of plastic. In this invention, metallic conductors 140 span between cells 110. Each conductor passes through a separator 130 and extends into the electrolyte 148 on each side of the separator. A cathode 145 extends into the component section containing lead dioxide, and an anode 150 extends into the component section containing the spongy lead, such that the direction of electron and ion flow may be appreciated as "d" as it passes though the battery and through load L.

The two half-reactions which would occur at such time as the battery is being discharged are as follows:

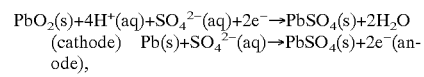
$PbO_2(s)+4H^+(aq)+SO_4^{2-}(aq)+2e^- \rightarrow PbSO_4(s)+2H_2O$ (cathode)   $Pb(s)+SO_4^{2-}(aq) \rightarrow PbSO_4(s)+2e^-$ (anode), such that the net reaction taking place in each cell is:

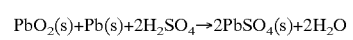
$PbO_2(s)+Pb(s)+2H_2SO_4 \rightarrow 2PbSO_4(s)+2H_2O$

It can be readily appreciated that this battery eliminates the greater weight associated with conventional lead acid batteries by not having to utilize the lead/antimony grid system associated with prior art batteries. Additionally, tests have shown that the battery made in accordance with the present invention exhibits a higher voltage than would otherwise be expected, resulting in more power or output per unit for batteries of similar weight. For example, instead of the 2 V associated with prior art battery cells, the cell of this invention has exhibited a voltage of 2.4–2.65 V open circuit voltage.

Not only is the battery of this invention cheaper than conventional lead acid batteries, it also is pollution free, since the colloid does not need to be discarded, but instead can be recharged to effectively enable longer battery life. Consequently, the battery is environmentally friendly. The batteries of this invention would not need to be recharged using electricity as is the case with typical rechargeable batteries. The fact that this battery uses a colloidal solution makes it drainable, as well as fillable, hence it can easily be recharged by total colloidal replacement.

For example, in one embodiment of the recharging associated with the present invention, the colloid would be drained into a tank at what the inventor terms a recharging station, with the tank being similar to the gasoline tanks at current gas stations, such that the batteries of the current invention can be refilled with new colloid at the same location. As such the entire colloid in a battery made in accordance with this invention is drained and then replaced. The used colloid can then be recharged for subsequent reuse in another vehicle.

The solution to the long-standing problem thus overcome by use of this invention is believed to have several applications. The potential uses associated with this higher performing type of power source are many. For example, by utilizing this type of battery in automotive vehicles, dependence on petroleum would effectively cease. As an added benefit, the vehicles would not pollute, thereby being viewed far more favorably by those concerned about the environment.

Plus, the vehicles would be safer due to the absence of a flammable fuel. Still further, it is believed that vehicles powered by batteries of this invention would be lighter, thereby permitting them to travel greater distances than would otherwise be the case. These vehicles also could have their colloid recharged, creating the need for commercially operated recharging stations similar in purpose to gas stations. Another example of a potential use would be in aircraft. A battery-powered aircraft would prevent future incidents similar to the catastrophes seen on Sep. 11, 2001.

While the battery of this invention herein described constitutes one embodiment of the invention as shown, it is to be understood that the invention is not limited to the precise embodiment as shown, and that changes may be made therein without departing from the scope of the invention which is defined in the appended claims. Persons skilled in the art will recognize from the foregoing detailed description that other modifications or embodiments are possible for use in the same or different environments.

What is claimed is:

1. A battery comprising
   cells containing electrolyte and a colloid, said battery being a lead-acid battery, and
   at least one conductor between directly adjacent cells, said conductor coming into contact with said electrolyte in each of said directly adjacent cells, each cell comprising at least one pair of component sections, and each pair of component sections being separated by a filter wherein said colloid is $PbO_2$.

2. The battery according to claim 1 wherein said filter has apertures formed therein.

3. The battery according to claim 2 wherein said filter has two sides with a channel formed connecting apertures on opposite sides of said filter.

4. The battery according to claim 3 wherein discharging of said battery will flush said filter.

5. The battery according to claim 1 wherein each component section is a halfcell.

6. A battery having cells, with there being at least one conductor between directly adjacent cells, said cells containing an electrolyte and a colloid, said conductor coming into contact with said electrolyte in each of said directly adjacent cells, with each cell being formed of at least one pair of component sections, with each of the component sections in the pair being separated by a filter having apertures formed therein on each of its two sides, with a channel formed connecting apertures on the opposite sides of the filter, such that when the battery discharges, the battery flushes the filter, said battery being a lead-acid battery.

7. The battery according to claim 6 wherein each of the component sections of the battery is a half-cell.

8. The battery according to claim 6 wherein said colloid is $PbO_2$.

9. The battery according to claim 1 wherein said conductor is metallic.

10. The battery according to claim 6 wherein said conductor is metallic.

11. The battery according to claim 1 wherein said directly adjacent cells are separated by a separator, said separator having said conductor passing therethrough.

12. The battery according to claim 6 wherein said directly adjacent cells are separated by a separator, said separator having said conductor passing therethrough.

* * * * *